United States Patent [19]

Maradan M. Gerard

[11] Patent Number: 4,971,431

[45] Date of Patent: Nov. 20, 1990

[54] DEVICE FOR THE TEMPORARY FIXING OF LENSES ON A SPECTACLE FRAME

[75] Inventor: Maradan M. Gerard, Morbier, France

[73] Assignee: A.L.P. Actuel Lunettes Production S.A.R.L., Morez, France

[21] Appl. No.: 258,906

[22] Filed: Oct. 17, 1988

[30] Foreign Application Priority Data

Oct. 16, 1987 [FR] France ................... 87 14567

[51] Int. Cl.⁵ ............................................. G02C 1/00
[52] U.S. Cl. ........................................ 351/86; 351/96; 351/154
[58] Field of Search ....................... 351/86, 96, 154

[56] References Cited

U.S. PATENT DOCUMENTS

| | | | |
|---|---|---|---|
| 1,545,529 | 7/1925 | Stevens | 351/96 |
| 1,636,337 | 7/1927 | Stevens | |
| 1,659,165 | 2/1928 | Sangren | 351/86 |
| 1,764,495 | 6/1930 | Beattey | |
| 2,781,693 | 2/1957 | Brumby | |

FOREIGN PATENT DOCUMENTS 2322500 5/1973 Fed. Rep. of Germany .
1126329 11/1956 France .
1543216 9/1968 France .

OTHER PUBLICATIONS

Patent Abstracts of Japan, vol. 10, No. 183 (P-472) [2239], 26 Jun. 1986, and JP-A-61 29 817 (Suehiro Sakurai) 10-02-1986.

*Primary Examiner*—Paul M. Dzierzynski
*Attorney, Agent, or Firm*—Wegner, Cantor, Mueller & Player

[57] ABSTRACT

The invention relates to a device for fixing lenses in the bezel rims of a spectacle frame, allowing easy and repeated mounting and removal of these lenses on to and from the frame. The bezel of the frame rim has a concave polyganol shape in cross-section. A metal ring sets the lens definitively round its periphery and has a rounded convex external edge. As viewed in cross-section, the contact between this external edge and the bezel is therefore made at points when the ring/lens assembly is fitted in the bezel rim.

12 Claims, 1 Drawing Sheet

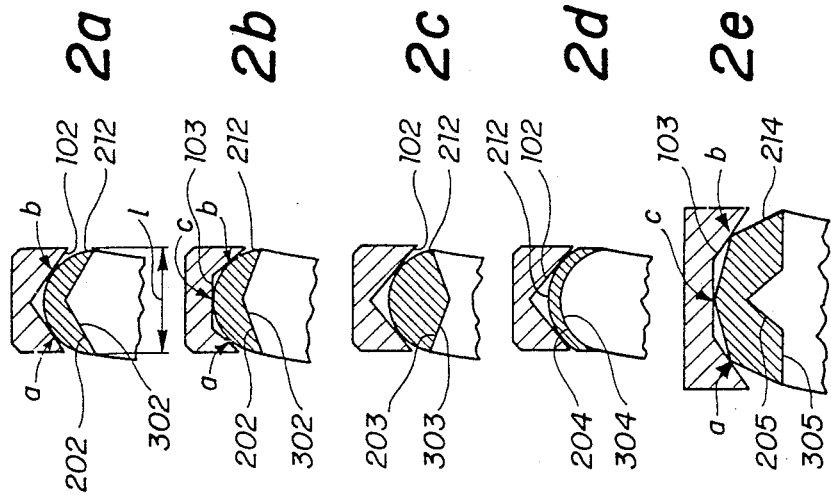
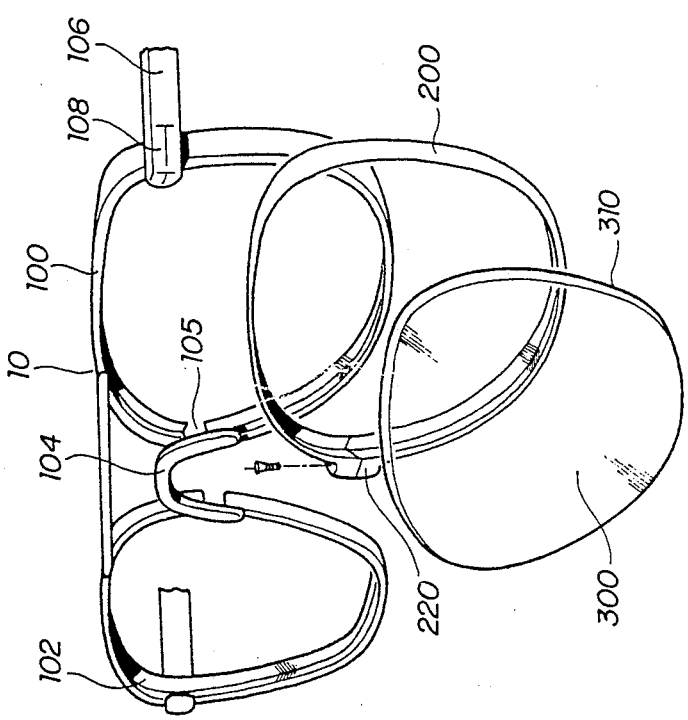
FIG. 1
FIG. 2

DEVICE FOR THE TEMPORARY FIXING OF LENSES ON A SPECTACLE FRAME

BACKGROUND OF THE INVENTION

1. Field of the Invention

The present invention relates to a device for fixing lenses in the bezel rims of a spectacle frame allowing easy and repeated mounting and removal of these lenses into and from the frame. Such a possibility is attractive for clients who have to wear corrective lenses and wish to be able to change frames frequently: for example women wishing to adapt the appearance of their spectacle frame to their dress and make-up or men who prefer a classical style of frame at work but a light, wire-type, well attached frame for practising a sport. Similarly, it is not always easy to determine which frame will be most suitable for a child who has to become accustomed to wearing spectacles for the first time. Furthermore, certain people might wish to buy a new frame for solar lenses each year, according to the fashion, if they could transfer previously purchased solar lenses of high quality in terms of filtering capacity, hardness and parallelism.

2. Description of the Prior Art

In current practice, opticians insert lenses, which are normally bevelled at the edges, in the bezel of the frame rim and close this rim by connecting the two end rim grippers by insertion of a screw. To prevent subsequent problems, the optician tends to tighten this screw firmly, thus setting the lens all the more firmly in the bezel. He will even lock this screw, using a punch, between the edge of the screw head and the rim gripper.

In order to change his spectacle lenses, the user firstly has to have a suitable tool: screwdriver, small pincers and small vice. He then needs a certain amount of skill to sense when the gripping of the bezel rim is sufficient to hold the lens securely without the risk of chipping it, particularly if the bevelled edge of this lens is not inserted perfectly in the bezel of the rim.

In practice, it is found that users prefer the optician to perform these operations and this obviously rules out frequent changes of frames.

It is known that a joint composed of resilient material such as rubber or plastic can be inserted between the lens and the bezel rim: specifications EP 061 002, DE 2 039 085, DE 3 038 032, but it is essential for the grip of the lens in the bezel rim to be snug. Furthermore, these materials tend to crush over time (phenomenon of creep) and the hold can become loose.

The specification FR 2 270 611 relates to an adapter ring which is placed between the bezel rim and a corrective lens and allows corrective lenses to be exchanged on a given frame. This ring transforms the bezel, which is internally V-shaped, into a truncated cone shaped support in which a flat-edged lens is wedged. This device suffers from several drawbacks. Firstly, the position of the lens with respect to rotation relative to the frame is uncertain. Secondly, the edge of the lens is not protected during an exchange and it can be ruined by poor handling. In particular, owing to the principle of wedging in a truncated cone shaped support, the lens can easily be released from the frame due to an impact.

SUMMARY OF THE INVENTION

The present invention aims to overcome the above mentioned difficulties by proposing a device for fixing lenses in the bezel rims of a spectacle frame which is firm but allows mounting and removal without special tools. The mechanics of this mounting and removal means should be easy to understand. This fixing device should be reliable over time, even if used daily, and its design should be sufficiently simple to allow easy production at low cost. Finally, as far as possible, such a device should remain discreet and should respect the appearance of the frame.

These objects are achieved by means of a fixing device comprising the bezel of the frame rim which has, in cross section, a concave polygonal shape and a metallic ring having a width substantially identical to that of the bezel, which sets the lens definitively over its periphery and has a rounded convex external edge. In this configuration, there is point contact, as viewed in cross section, between this external edge and the bezel when the ring/lens assembly is set in the bezel rim.

It is advantageous if the ring comprises a lug or a rim gripper which engages in an opening in the frame rim thus allowing exact positioning of the lens with respect to rotation on the frame. This opening can be made in the vicinity of the bridge, or of the rim grippers closing the frame rim or, alternatively, on the front or rear bar of the ornamental strips.

In a cross section, it is advantageous if the bezel has a triangular or semi-hexagonal shape and the external edge of the ring is semi-circular.

When viewed in cross section, it is preferable for the edge of the lens and the internal edge of the ring, both to have a triangular shape, one being turned towards the exterior and the complementary one being turned towards the interior. According to another preferred embodiment, the edge of the lens and the internal edge, still viewed in cross section, both have a semi-circular shape, one being turned towards the exterior and the complementary one being turned towards the interior.

BRIEF DESCRIPTION OF THE DRAWINGS

The invention is described in more detail below by means of non-limiting embodiments illustrated in the accompanying drawings.

FIG. 1 is a perspective view of a spectacle frame, a ring and a lens according to the invention.

FIGS. 2a to 2e show variations of the profiles given to the rim, ring and lens edge, in section.

DETAILED DESCRIPTION OF THE INVENTION

With reference to FIG. 1, a pair of spectacles according to the invention is composed of a spectacle frame 10, a pair of setting rings 200 and a pair of solar or corrective lenses 300.

In the conventional manner, the spectacle frame comprises two spectacle rims 100 which are connected by a bridge or nose piece 104 and on the respective external sides of which an arm 106 is attached by means of a hinge allowing these arms to be opened when the spectacles are being worn or closed when they are put away. In the case of metal frames, these frame rims are produced, for example, from curved metal profiles which are closed in the region of the rim grippers 108 by screwing or soldering. The frame rim and bridge assembly can also be shaped from a metal plate or, in the case of plastic spectacles, this assembly can be cast or injection moulded in one piece from cellulose acetate.

According to the invention, the material and the external shape of this frame can be as desired and will therefore follow the various fashion trends. On the other hand, the internal shape of each frame rim as well as the external shape of the corresponding lenses is standardised to two or three typical shapes: pseudo-circular, pseudorectangular or triangular with widely rounded corners. For each of the typical shapes, the standard stipulates the dimensions in length, width as well as in curvature of the respective sides.

An opening 105 is made in the thickness of each frame rim 100 at a position which does not affect the strength of the assembly: that is to say in the region of the join between the rim and the bridge or the join between the rim and the rim gripper 108 or the join between the rim and the front bar. This opening 105 can also be made in a thickened region added at any point and hidden behind an ornamental strip.

A setting ring 200 composed of hard material, preferably of chromium-plated metal, surrounds each lens 300 definitively. This ring is produced, for example, by bending a section of metal profiles, at the ends of which there are attached or shaped two rim grippers 220 allowing this ring to be closed by soldering or by a screw. Alternatively, this ring is closed by direct soldering of the ends and a positioning lug 220 is provided. The thickness of this ring is sufficient to prevent it from being enlarged by elastic deformation which would cause the lens to be released, but it is kept to a minimum for aesthetic reasons. This thickness is between 0.8 and 2 mm, preferably 1.2 mm.

FIGS. 2a to 2e show, in cross section, the possible variations according to the invention for joining profiles for the internal groove or bezel of the frame rim, for the setting ring and for the external edge of the lens. Each profile connection should be such that the setting of the lens 300 in the ring 200 is definitive and the setting of the ring/lens assembly within the bezel is firm but manually releasable as necessary.

In FIGS. 2a and 2b, the internal edge profile of the ring 202 is concave and triangular and the external edge profile of the lens 302 is convex, triangular and strictly complementary to the profile 202. In FIG. 2c, these profiles are still triangular but, in this case, the profile 203 of the ring is convex and the profile 303 of the lens is concave. However, this combination of profile is little used owing to the fragility of this type of profile 303 in a material such as glass.

In FIG. 2d, the ring 204 has a concave semi-circular internal profile and the edge of the lens 304 a convex semi-circular profile which is strictly complementary to the profile 204.

FIG. 2e shows a variation for particularly wide lenses such as corrective lenses for myopia in which the triangular complementary profiles 205 and 305 occupy only half of the thickness of the lens. In this Figure, the profile 205 is concave and the profile 305 is convex but, in view of the thickness of this lens, therefore its intrinsic strength, it is quite possible to produce the reverse: a convex profile 205 and a concave profile 305.

Owing to such combinations of strictly complementary profiles, the contact between the ring and the lens is uniform over the entire surface formed by the external edge of the lens which is also the surface formed by the internal edge of the ring. Since these surfaces are concave/convex, the setting of the lens in the ring is just as strong laterally to the right as to the left, as shown in FIGS. 2. Such a setting is considered as definitive.

Conversely, when viewed transversely in FIGS. 2, the profile of the bezel of the rim of the frame 100 and of the external edge of the ring are such that contact between this ring and the bezel occurs at points.

In FIGS. 2a, 2c and 2d, the bezel 102 has a triangular shape whereas the external edge of the ring 212 has a semi-circular shape. The contact is thus made only at two points: on the right at b and on the left at a. In FIG. 2b, the bezel 103 has a semi-hexagonal shape whereas the internal edge of the ring 212 is still semi-circular. Contact is thus made at three points: on the left at a, on the right at b and in the centre at c.

In FIG. 2e, which shows a variation for thick lenses, the bezel 103 is concave and semi-hexagonal and the profile of the external edge 214 of the ring is also semi-hexagonal but convex and turned by an angle of 30° relative to the profile 103 such that the convex rounded angles of the profile 214 are in contact with the profile 103 in the centre of the sides constituting the semi-hexagonal shape of the bezel: points a, b and c.

As can be seen in FIGS. 2, the horizontal width of the bezel 102 or 103 is substantially identical to the width (1) of the ring 200, implying that contact can only be made on the edge of the ring and never on its sides, that is the parts close to the lens. In other words, the frame rim 100 with its bezel 102 surrounds at most a third, or even half of the vertical thickness of the ring, but never extends to the level of the lens 300.

Furthermore, the slope of the external faces of the bezel does not normally exceed 60° relative to the horizontal, as seen in FIG. 2b and, instead, assumes a value of approximately 45° in the case of a triangular bezel (FIG. 2a, c and d).

Moreover, owing to the combination of these respective profiles, contact between the ring 200 and the frame rim 100 is produced over the periphery, along two or three thread-like edges (and not surfaces): at a minimum one on the right "a" and one on the left "b", and possibly another one in the centre at "c" as seen in FIGS. 2. The thread of contact "a" secures the lens/ring assembly against undesirable movement to the left, and the thread "b" secures the assembly against an undesirable movement to the right.

Obviuosly, the holding of the ring/lens assembly in the frame rim, produced along two threads "a", "b", is sufficient to secure the ring/lens assembly permanently in the frame but it is manifestly inferior to the fixing achieved by setting the lens 300 completely in the ring 200.

As described above, this device for fixing lenses on a spectacle frame is used in the following manner. The client purchases, on the one hand, a pair of corrective or solar lenses which are already set in the ring 200 by the optician. On the other hand, he purchases one or more spectacle frames according to the invention, that is to say of any external shape corresponding to aesthetic criteria, the internal shape of their bezels complying with the same standard as the previously purchased lenses. With reference to FIG. 1, the user holds the empty frame 10 in one hand and the lens/ring assembly in the other hand. He then fits the rim gripper 220 from behind into the opening 105 while keeping the lens substantially parallel with the bezel. Once the rim gripper has engaged, he holds this rim gripper in position with the thumb and index finger of his left hand, for example, and fits the adjacent side of the ring into the groove with the thumb and index finger of his right hand. Then, still with the thumb and index finger of his right hand, he continues inserting the ring 200 in the groove 102 until he feels a certain tension occurring when, after going round the periphery, he comes back to the starting point. Thus, by simultaneous action of the two index fingers and the thumb, he forces the last part of the ring into the bezel, acting on the elasticity of the frame rim. This method of mounting is very similar to the well known method of mounting a tire on the rim of a wheel.

The insertion of the rim gripper 220 or of the lug which replaces it into the opening 105 has to ensure the exact positioning in the sense of rotation of the lens in the bezel, this positioning being very important in the case of corrective lenses.

Conversely, to remove the lens/ring assembly from the frame, the user holds the frame in his hand by a part remote from the part containing the opening and the rim gripper, that is to say the arms, for example, in the case shown in FIG. 1. Then, by simply pushing his thumb laterally on the lens/ring assembly, he removes this assembly from the frame. He can also recover the lens, the periphery of which is still protected by the metal ring 200.

This simple method of mounting and removing this assembly into and from the bezel is possible owing to the combination of several technical effects: the proportions of the bezels 102, 103, relative to those of the section of the rings 200, the number and arrangement of the contact points "a", "b" and "c", the elasticity of the material constituting the rim 100 and the coefficient of friction between the ring and the bezel.

In fact, the horizontal width of the bezel 102, reduced to the actual width (l) of the ring 200, as well as its vertical depth as defined by the slope of its lateral faces, define a minimum enlargement required of the rim 100 when the assembly comprising the ring 200 and the lens 300 is fitted in this rim. This enlargement is made possible owing to the elasticity and the low coefficient of friction relative to the ring of the material of the rim, involving only a reasonable lateral releasing force. However, this lateral force is real to ensure that the ring/lens assembly is held securely in the frame when the spectacles are being worn. The existence of contact at points rather than over the entire surface greatly reduces the frictional forces to be overcome when releasing the assembly. Moreover, the coefficient of friction and of sliding of the metal/metal or metal/plastic contact is significantly lower than the coefficient of contact between lens and metal or lens and plastic. In fact, the metal surfaces retain a smooth and polished appearance for longer than the lens which can be chipped at any time.

Various improvements can be made to this device without departing from the scope of this invention. For example, the retention of the lens 300 in the ring 200 can be improved by inserting a joint of elastic material which allows more highly consistent gripping. This setting of the lens in the ring can also be assisted by depositing a fine layer of adhesive into the internal edge of the ring before inserting the lens. In addition, for particularly thick frame rims of low elasticity, a transverse cut and a join between the edges thus formed can be provided at any point on the periphery of this rim by means of elastic means such as a spring. The plate-holder and plate assembly can also be integral with the setting ring 200 rather than the frame rim 10. This mounting is of greater interest in the case of plate-holder/plate assemblies which provide an element of comfort which is appreciated but is onerous to produce. Thus, such a plate/plate-holder assembly, which is particularly well suited to a given user, follows the lenses in the successive frames.

As described hereinbefore, the ring 200 is produced so as to be as discreet as possible: slight thickness and neutral colour. Conversely, this ring can also contribute to the general appearance of the spectacles, particularly if it is produced from white metal and is mounted on a two-coloured yellow and white gold metal frame.

What is claimed is:

1. A device for fixing lenses in the bezel rims of an eyeglass frame having a lens-receiving opening whose shape corresponds to the shape of the lens, allowing easy and repeated mounting and removal of said lenses on to and from the frame, wherein the bezel of the frame rim has a concave polygonal shape in cross-section, said device comprising a metal ring having a width substantially equal to that of the bezel adapted to encircle and grip the lens around its periphery and to, in turn, be inserted into the bezel rim, said metal ring having a rounded convex external edge whereby, when viewed in crosssection, there is point contact between said external edge and the bezel when the ring/lens assembly is set in the bezel rim.

2. A device for fixing lenses in the bezel rims of an eyeglass frame according to claim 1, in which the ring comprises a lug or a rim gripper which engages in an opening made in the frame rim and ensures precise positioning with respect to rotation of the lens on the frame.

3. A device for fixing lenses in the bezel rims of an eyeglass frame according to claim 2, in which the opening is made in a location which does not affect the strength of the frame.

4. A device for fixing lenses in the bezel rims of an eyeglass frame according to claim 2, in which the opening is made in a thickened area added to the frame and hidden by an ornamental strip.

5. A device for fixing lenses in the bezel rims of an eyeglass frame according to claim 1, in which, when viewed in cross-section, the bezel has a triangular shape and the external edge of the ring is semi-circular.

6. A device for fixing lenses in the bezel rims of an eyeglass frame according to claim 1, in which, when viewed in cross-section, the bezel has a semi-hexagonal shape and the external edge of the ring is semi-circular.

7. A device for fixing lenses in the bezel rims of an eyeglass frame according to claim 1, in which, when viewed in cross-section, the edge of the lens and the internal edge of the ring have a triangular shape, one being turned to the exterior and the complementary one turned to the interior.

8. A device for fixing lenses in the bezel rims of an eyeglass frame according to claim 1, in which, when viewed in cross-section, the edge of the lens and the internal edge of the ring have a semi-circular shape, one being turned towards the exterior and the complementary one being turned towards the interior.

9. A device for fixing lenses in the bezel rims of an eyeglass frame according to claim 1 wherein the bezel of the frame rim has an opening at a predetermined location, said metal ring having means for engaging in said opening to thereby ensure precise positioning of the lens in the frame when the ring/lens assembly is set in the bezel rim.

10. In combination an eyeglass frame having bezel rims, the bezel of said frame rim having a concave polygonal shape in cross-section, the frame having a lens-receiving opening whose shape corresponds to the shape of a lens to be inserted in the frame, and a means for fixing lenses in said bezel rims allowing easy and repeated mounting and removal of said lenses on to and from the frame, said fixing means comprising a metal ring having a width substantially equal to that of the bezel and adapted to encircle and grip the lens around its periphery, said metal ring having a rounded convex external edge and being inserted into the bezel rim, whereby, when viewed in cross-section, there is point contact between said external edge and the bezel when the ring/lens assembly is set in the bezel rim.

11. The combination of claim 10, wherein the frame is provided with an opening in a location which does not affect the strength of the frame, and said metal ring is provided with means for engaging in said opening to thereby ensure precise positioning of the lens in the frame when the ring/lens assembly is set in the bezel rim.

12. The combination of claim 10, wherein said frame is provided with a position-fixing opening at a predetermined location, said fixing means having means for engaging in said position-fixing opening to thereby ensure precise positioning of the lens in the frame when the ring/lens assembly is set in the bezel rim.

* * * * *